United States Patent [19]

Suzuki et al.

[11] 4,134,658

[45] Jan. 16, 1979

[54] SHUTTER RELEASE SYSTEM FOR A CAMERA

[75] Inventors: Toyostosi Suzuki, Tokyo; Takashi Uchiyama; Noriaki Sanada, both of Yokohama; Tetsuya Taguchi; Ryoichi Suzuki, both of Kawasaki; Michio Hirohata, Inagi, all of Japan

[73] Assignee: Canon Kabushiki Kaisha, Tokyo, Japan

[21] Appl. No.: 742,939

[22] Filed: Nov. 18, 1976

[30] Foreign Application Priority Data

Nov. 20, 1975 [JP] Japan .................................. 50/139682
Dec. 18, 1975 [JP] Japan .................................. 50/151409
Dec. 18, 1975 [JP] Japan .................................. 50/151410
Dec. 24, 1975 [JP] Japan .................................. 50/155669

[51] Int. Cl.² .................................................. G03B 17/38
[52] U.S. Cl. .................................... 354/266; 354/234
[58] Field of Search ............... 354/266, 267, 234, 258

[56] References Cited

U.S. PATENT DOCUMENTS

| 3,906,532 | 9/1975 | Kuramoto et al. | 354/258 |
| 3,922,693 | 11/1975 | Matsui | 354/234 X |
| 3,927,416 | 12/1975 | Inoue | 354/266 X |
| 4,051,498 | 9/1977 | Kitai | 354/267 X |

*Primary Examiner*—John Gonzales
*Attorney, Agent, or Firm*—Toren, McGeady and Stanger

[57] ABSTRACT

A shutter release system for a camera having an electric shutter, made so that when a power source battery is exhausted preventing a shutter control circuit from properly functioning, it is detected to block shutter release and an electric control mode is changed over to a mechanical control mode by handling a change over means for conducting an exposure with a constant period of time.

3 Claims, 17 Drawing Figures

SHUTTER RELEASE SYSTEM FOR A CAMERA

The present invention relates to a camera, particularly to a shutter release system for a camera having an electric shutter. Generally speaking many of electric shutter cameras are so made that a shutter leader screen is released by a mechanical means associated with a pressing of a shutter button and a shutter follower screen is released by an electro-magnet activated by an output of an exposure time control circuit, but said electro-magnet will not be sufficiently magnetized when voltage is lowered as a power source is exhausted in such camera, thus a shutter follower screen is not surely secured, which results in such shortcomings that when a shutter button is pressed a shutter leader screen and a shutter follower screen simultaneously start running thus exposure is not done at all. If a photographer continues photographing without noticing such failure, it results in wasting of film. The present invention is to eliminate such shortcomings.

For that end, the present invention has such a set up that when the voltage of a power source is lowered and an electro-magnet is not properly functioning these conditions are to block the release of a shutter and at a same time said blocking is released by a release means thereby automatically changing over the shutter to a mechanical exposure control mode. Now the present invention will be explained in detail referring to examples.

FIG. 1 to FIG. 3 show a first example, wherein FIG. 1 is an oblique view to show a state in which shutter is charged, and FIG. 2 is an oblique view to show a state in which shutter release is blocked, while FIG. 3 shows an exposure control circuit.

FIG. 4 and FIG. 5 show a second example, wherein FIG. 4 is an oblique view to show a state in which a shutter is charged when an electro-magnet functions properly, and FIG. 5 is an oblique view to show a state in which a shutter release is blocked.

FIG. 6 to FIG. 8 show a third example, wherein FIG. 6 is an oblique view to show a state in which a shutter is charged when an electro-magnet functions properly, and FIG. 7 is an oblique view to show a state in which a shutter release is blocked. FIG. 8 is an oblique view to show a state in which said blocking is released.

Figure 9:
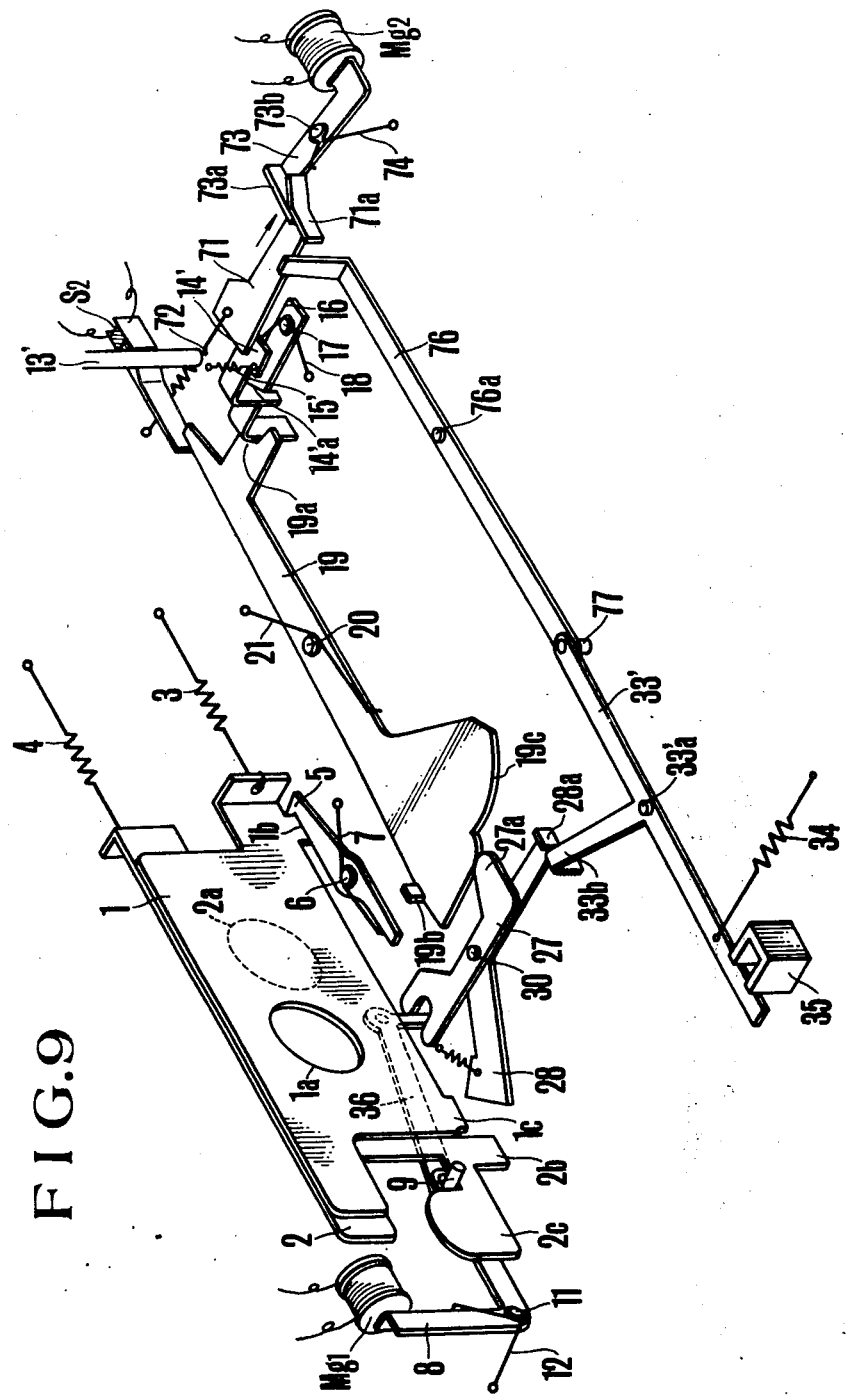
Figure 10:
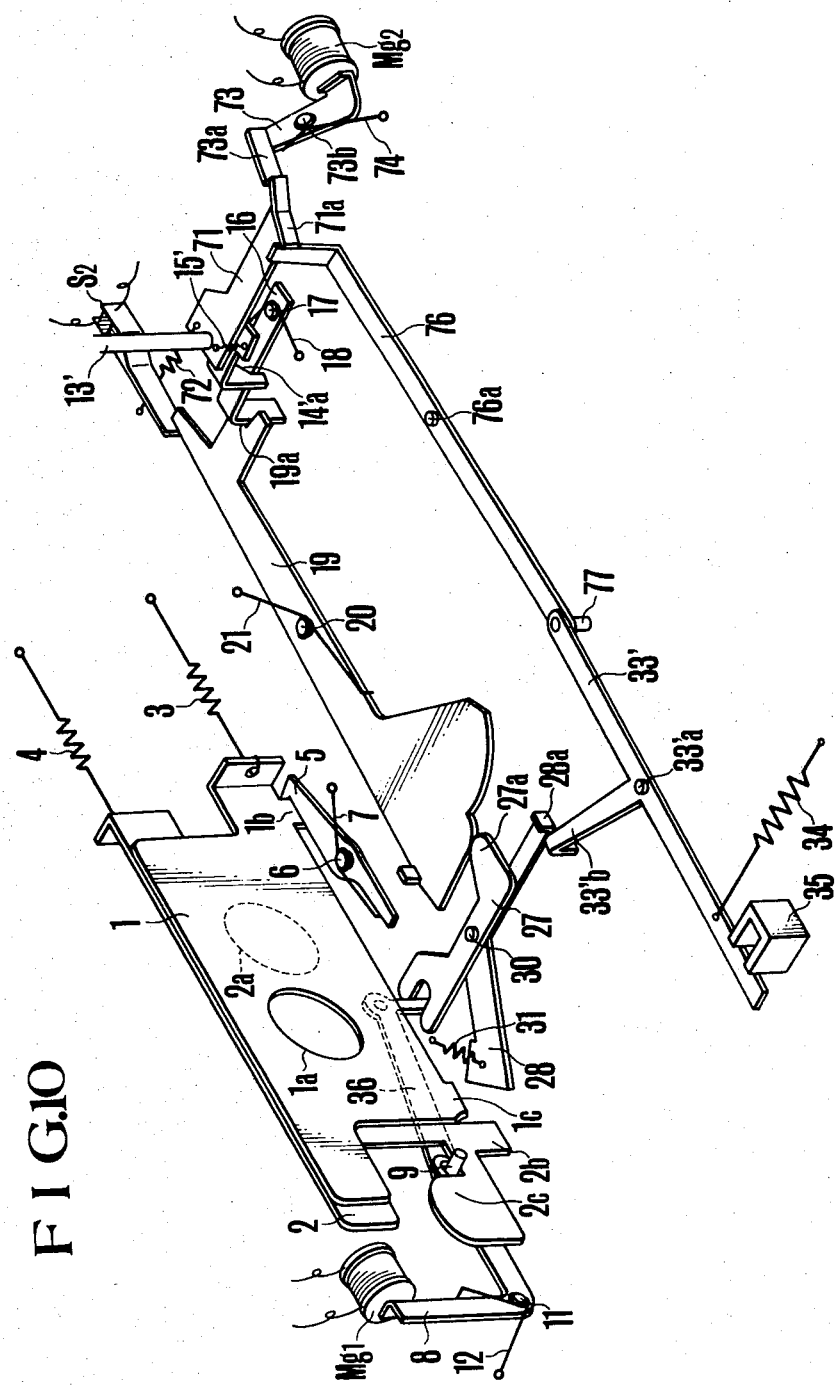
Figure 11:
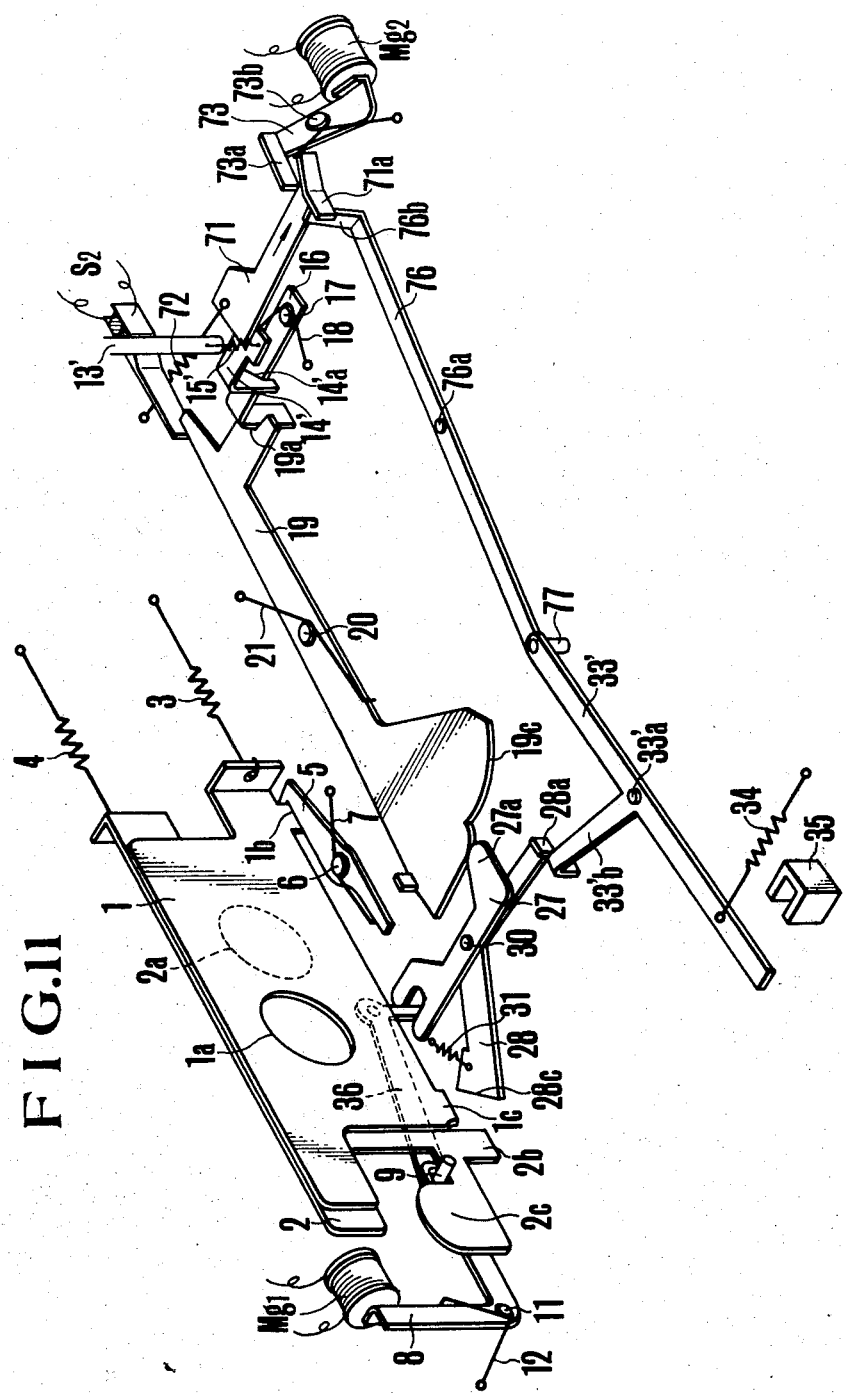
Figure 12:
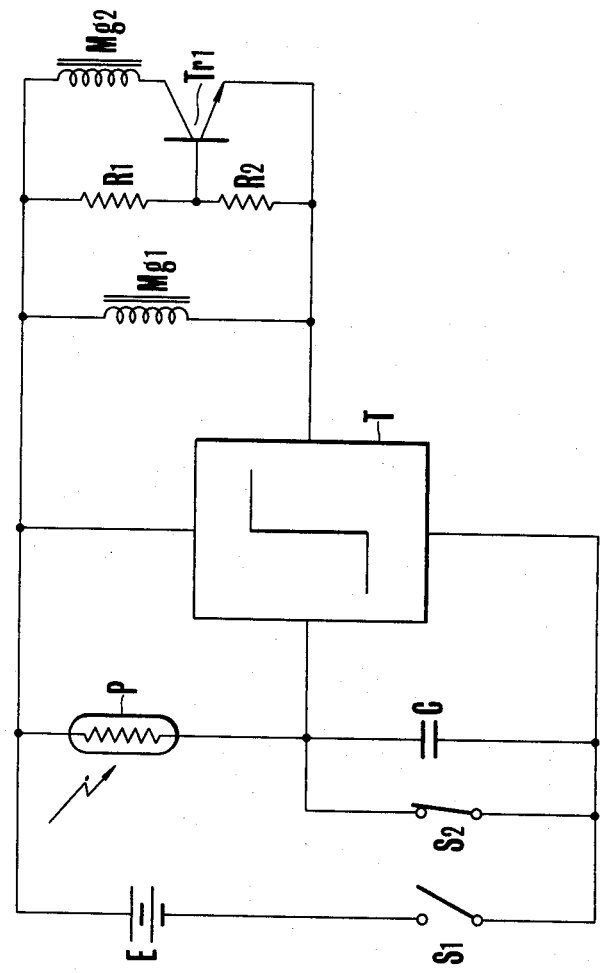

FIGS. 9 to 12 show a fourth example, wherein FIG. 9 is an oblique view to show a state in which a shutter is charged when an electro-magnet functions properly, and FIG. 10 is an oblique view to show a state in which the electro-magnet does not function and shutter release is blocked, while FIG. 11 is an oblique view to show a state in which said blocking is released, and FIG. 12 shows a control circuit.

Figure 13:
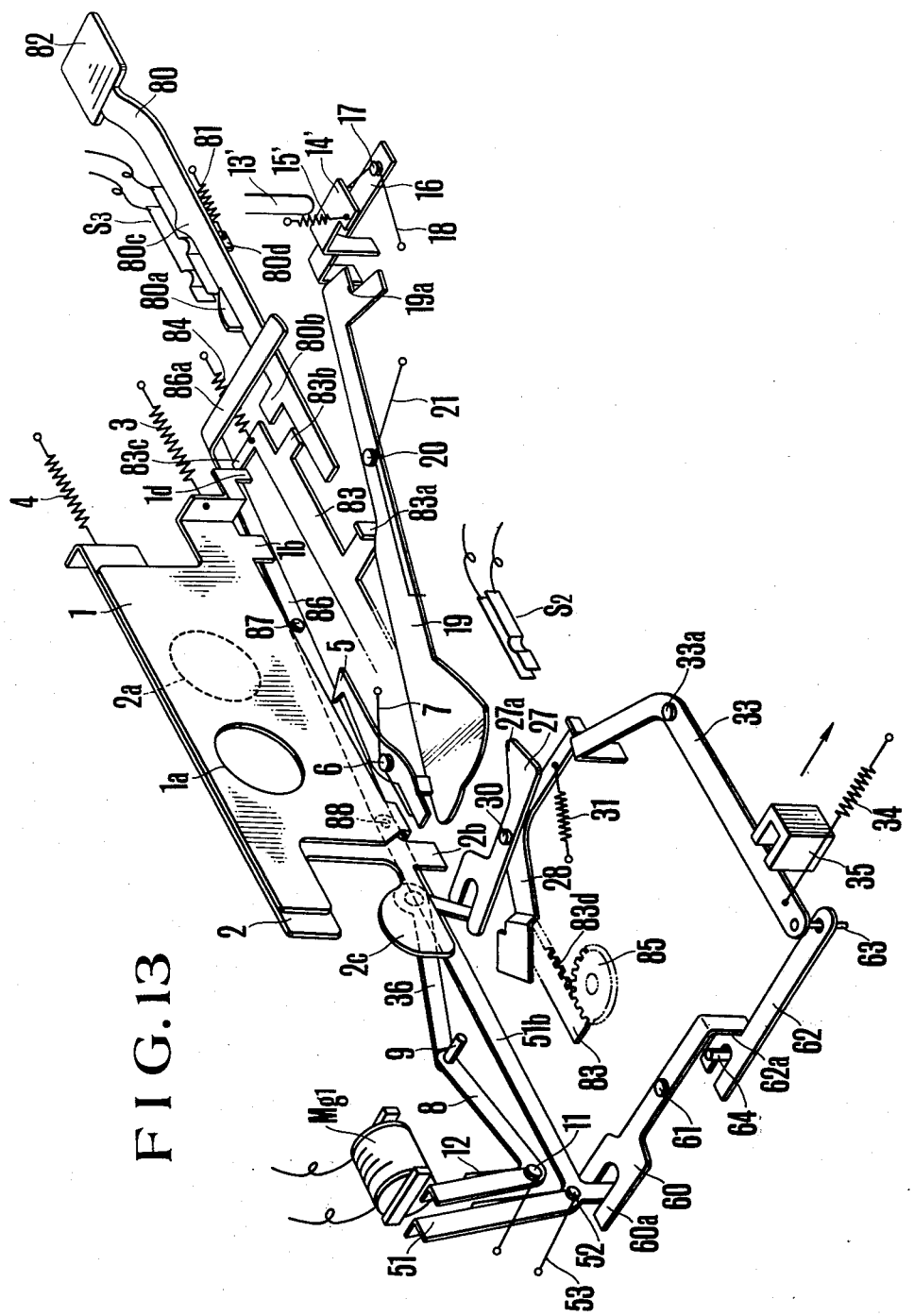
Figure 14:
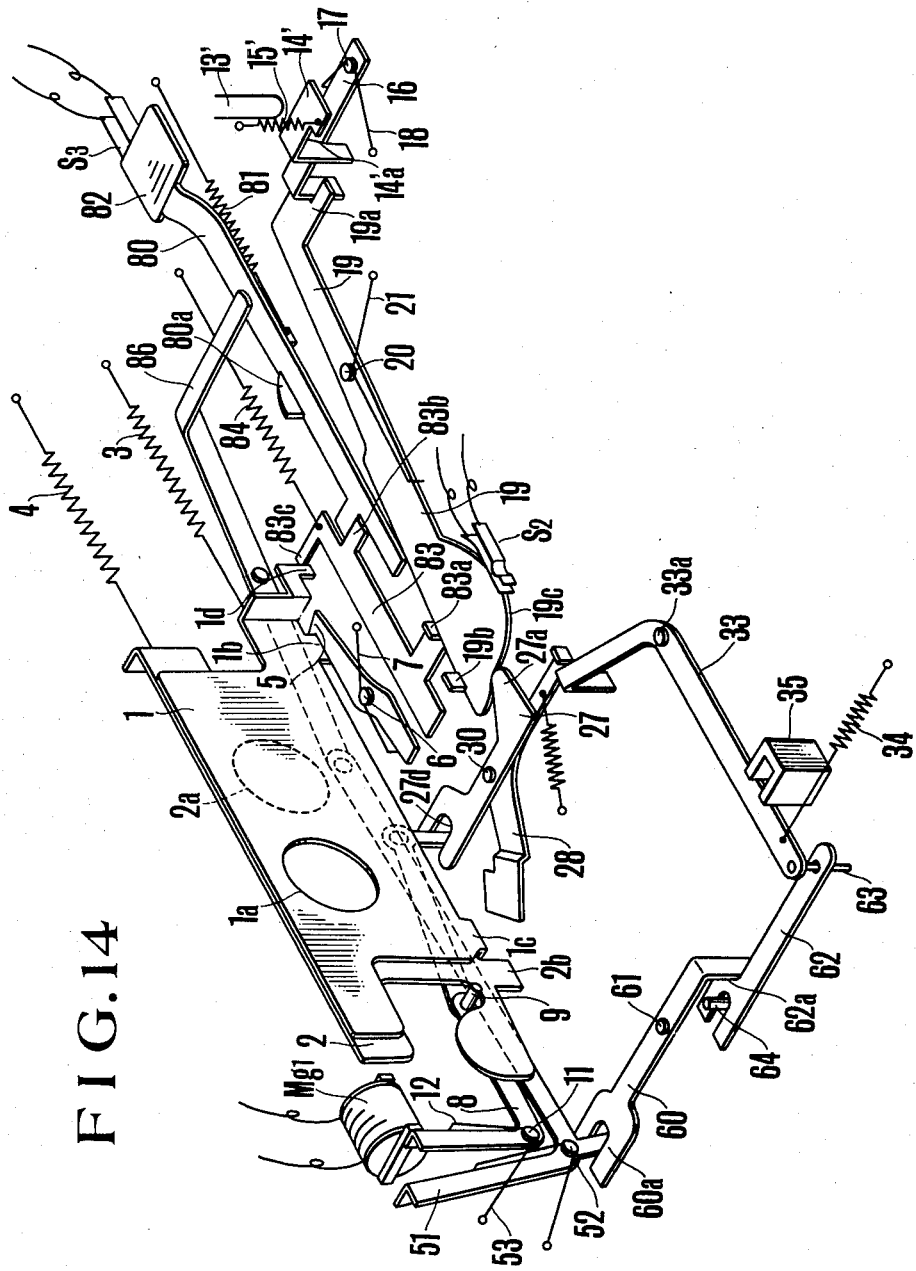
Figure 15:
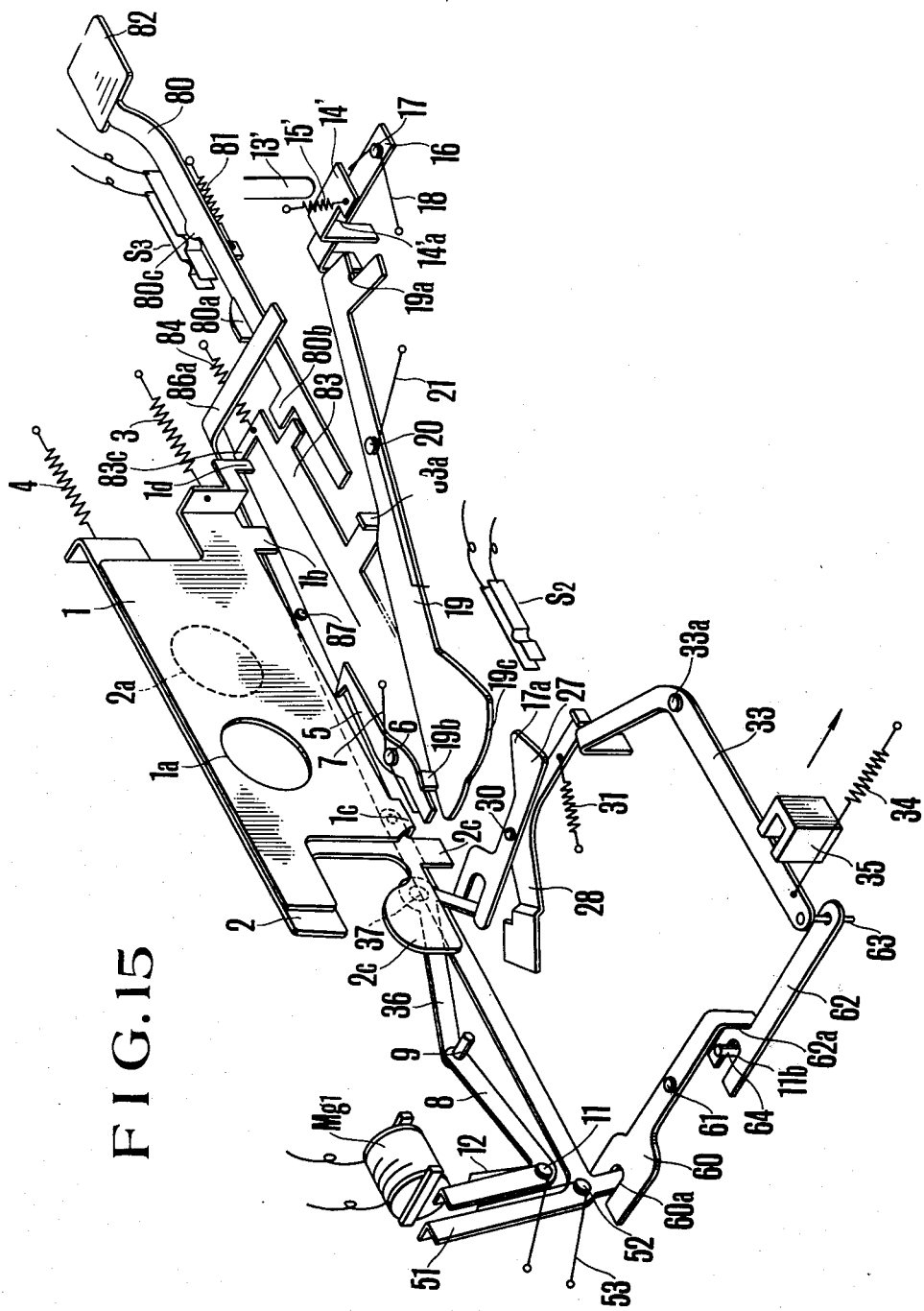
Figure 16:
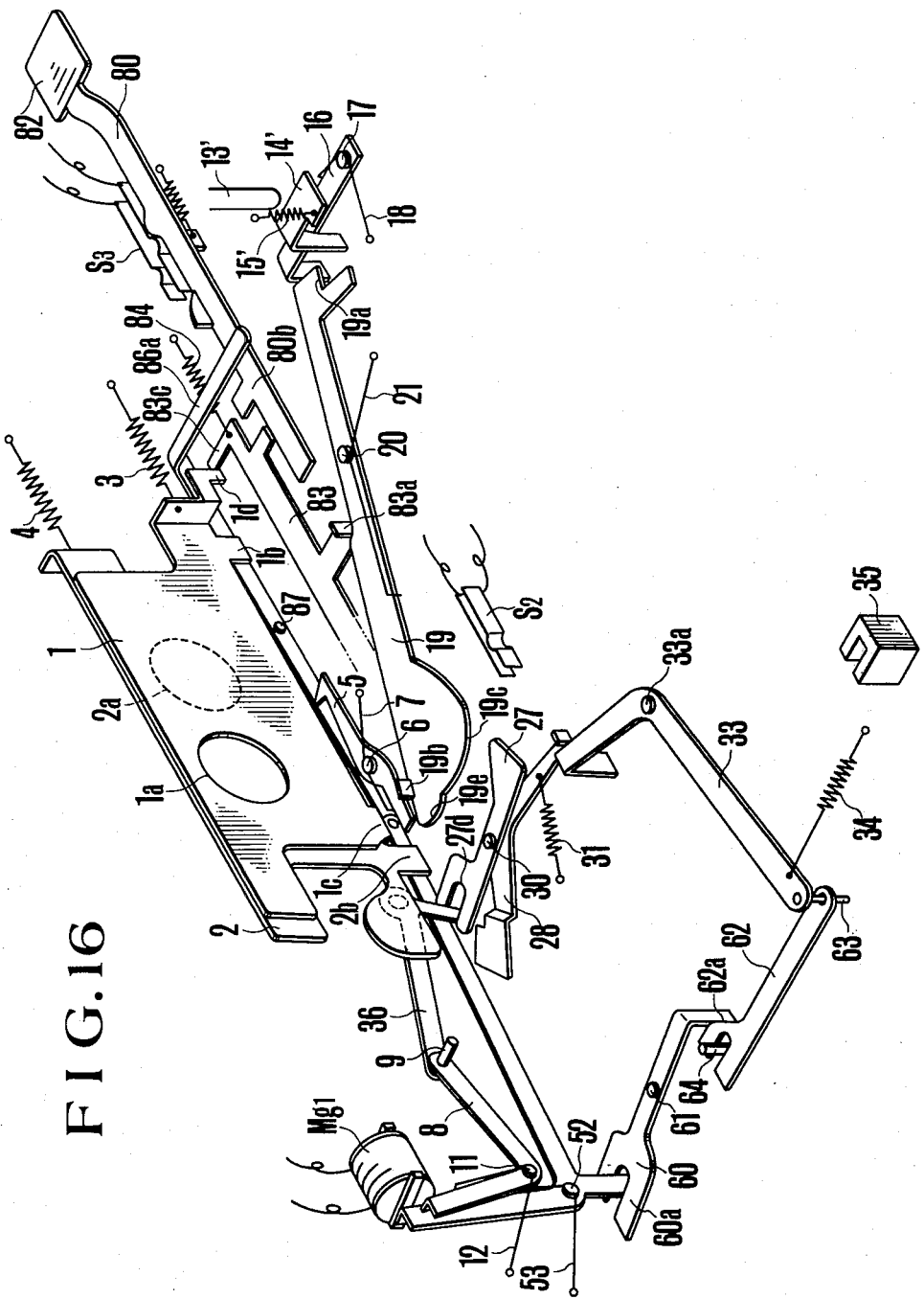
Figure 17:
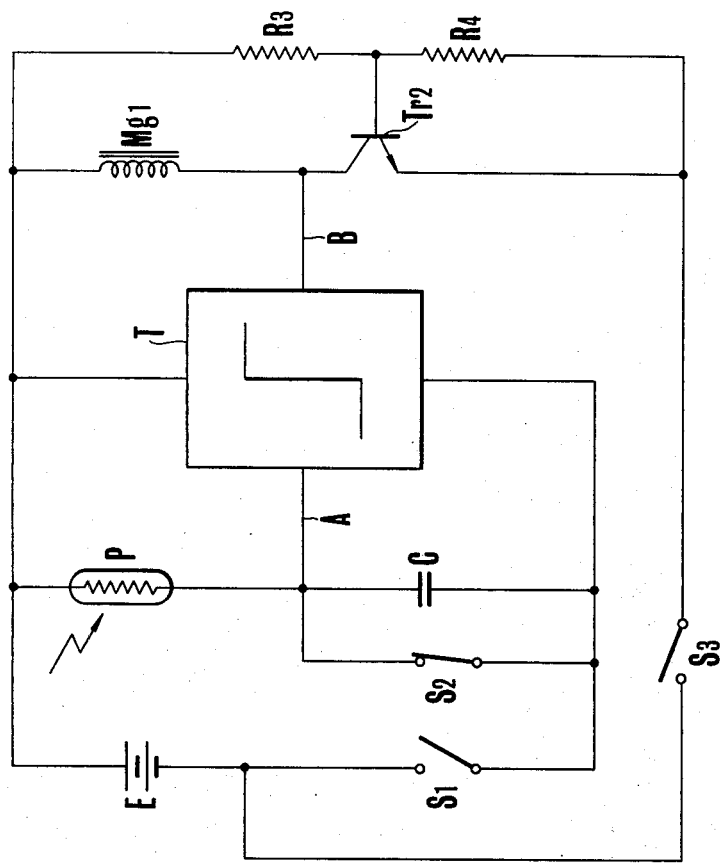

FIG. 13 to FIG. 17 show a fifth example, wherein FIG. 13 is an oblique view to show a state before a shutter is charged, and FIG. 14 is an oblique view to show a state immediately after shutter is charged, while FIG. 15 is an oblique view to show a state in which a shutter charge is blocked, and FIG. 16 is an oblique view to show a state in which said blocking is released, while FIG. 17 is a circuit diagram.

Figure 1:
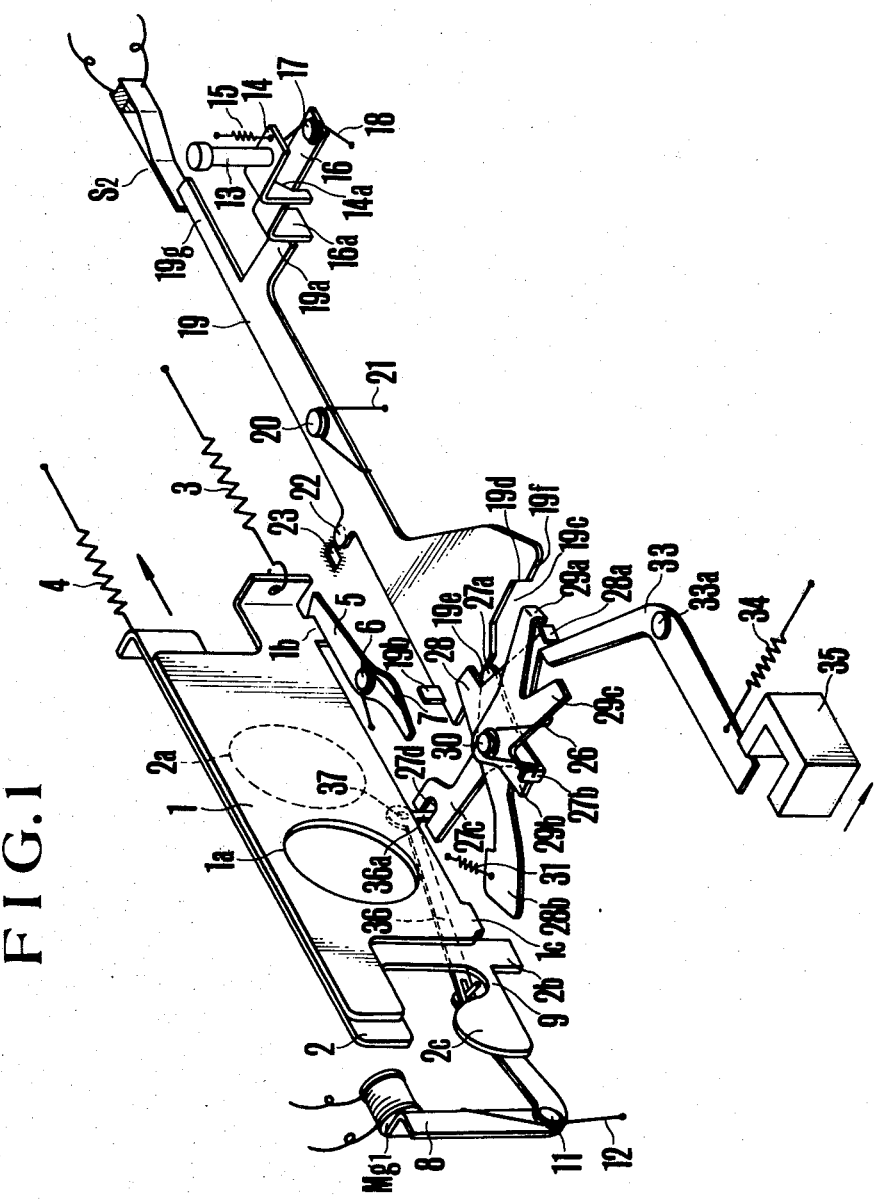

In FIG. 1, what is shown as 1 is a shutter leader screen having an exposure aperture 1a, and projection parts 1b and 1c, and it is biased by a spring 3 in the direction of an arrow. What is shown as 2 is a shutter follower screen having an exposure aperture 2a, a projection 2b engaging with said projection 1c of the leader screen, and a projection 2c engaging with a blocking lever. The shutter following screen 2 is biased by a spring 4 in the same direction as that of the leader screen 1. What is shown as 5 is a blocking lever engaged with said projection 1b to block the leader screen at a charged position, being provided in a rotatable manner around an axle 6, and being biased by a spring 7 in a direction for engagement with said projection 1b. What is shown as 8 is a follower screen blocking lever, having a pin 9 engaging with said projection 2c of the follower screen, fixedly provided at one of its arms, while the other arm thereof is axially supported in a manner rotatable around an axle 11 so as to be attracted to an electromagnet Mg1 for retaining follower screen. The lever 8 is biased by a spring 12 in a direction resisting the attracting power of the electro-magnet. What is shown as 13 is an axle coupled with a shutter button, and 14 is a cam plate fixed at the lower end of the axle 13, having a cam plane 14a and being biased together with the axle 13 by a spring 15 in the upward direction in the drawing. What is 16 is a release lever, being axially supported in a manner rotatable around an axle 17, and being biased to a direction wherein the side edge thereof contacts said cam plane 14a, and a bent part 16a at its forward end engages with an arm of an initiating lever 19. The initiating lever 19 is axially supported in a manner rotatable around an axle 20 and is biased by a spring 21 to clockwise direction, having on one of its arms a notched part 19a engaging with said release lever, while having on the other arm thereof a projection 19b and a notched part 19c engageable with the leader screen blocking lever 5. What is shown as 29 is a release blocking lever having a bent part 29a arranged to engage with a part 19d of said notch 19c, and what is shown as 28 is a delay lever provided in a manner rotatable around an axle 30 which is co-axial with the lever 29, and said lever 28 has a bent part 28a arranged to engage with a change over lever 33 to be described below and an arm 28b arranged to engage with said projection 2b of the shutter follower screen, and it is biased by a spring 31 to clockwise direction. What is shown as 27 is an associating lever axially supported in a manner rotatable around the axle 30, and one of its arms, 27a, engages with a side edge 19e of said initiating lever while another arm 27b thereof engages with the arm 29b of the blocking lever, being coupled together by a spring 26. A two arm forked part 27d provided at the other arm 27c of the lever 27 engages with an arm 36a of such transmission lever 36 as rotatable around an axle 37. The other arm of the transmission lever 36 engages with the pin 9 of said follower screen blocking lever 8.

The change over lever 33 is axially supported in a manner rotatable around the axle 33a and is pulled by a spring 34 to engage at one of its arms with a cover 35 of a battery chamber and engages at the other arm thereof with said bent part or arm 28a of the delay lever 28. What is shown as 22 is a red color mark provided at lower plane of the initiating lever 19, and can be visually seen from outside through a viewing window 23 provided at a cover of a camera when said initiating lever 19 rotates and a shutter is released.

Figure 3:
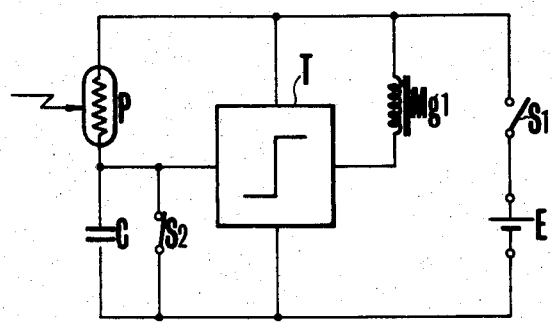

FIG. 3 is a circuit diagram of an electronics shutter used in the present invention, wherein E shows a power source battery, S1 shows a main switch, P shows such a photo-conductive element as cadmium sulfide, C shows a capacitor, S2 shows a switch to start counting, and T shows a Schmidt circuit, generating output voltage only when the input voltage reaches a prescribed level. Mg1 is an electro-magnet for retaining the follower screen mentioned above.

Next, explanations will be made of the function of the shutter mechanism when the electro-motive voltage of the battery E is at a limit value for use or above and the electro-magnet functions properly. When the shutter leader screen 1 and the follower screen 2 are shifted by a wind up mechanism not shown in the drawing, resisting the springs 3 and 4, and a shutter button is pressed down from a state wherein the leader screen 1 is blocked by the blocking lever 5 as shown in FIG. 1, the main switch S1 is closed by a means not shown in the drawing, and current flows to the magnet Mg1, generating magneto-motive force to attract the follower screen retention lever 8. The cam plate 14 lowers together with the button axle 13 by continuous pressing down, pushing the side edge of the release lever 16 by the slanted plane 14a thereof and rotates said lever 16 in the clockwise direction around the axle 17 resisting the spring 18. By this the engagement between the bent part 16a of the lever 16 and the notched part 19a of the initiating lever 19 is released, and the lever 19 starts rotation in clockwise direction around the axle 20 by the force of the spring 21. At this time, the count starting switch S2, which has been pushed by one end 19g of the lever 19 and closed, will be opened and counting is started. At a same time the projection 19b of the lever 9 pushes the tail end of the leader screen blocking lever 5, rotating the same in the clockwise direction around the axle 6 to release the blocking of the projection 1b of the leader screen, therefore the leader screen 1 is pulled by the spring 3 and runs in the direction of the arrow to start exposure. At a same time, as the switch S2 is opened, as mentioned above, the charging of the capacitor C through the photo-conductive element P is started, and the charged voltage is increased according to the amount of light received by the photo-conductive element P, then as the voltage reaches a prescribed level, output voltage is generated at the output terminal of the Schmidt circuit T, thereby the current of the magnet Mg1 is shut down thus magneto-motive force is eliminated. Since the follower screen blocking lever 8 rotates due to the force of the spring 12 in the counter-clockwise direction, the pin 9 thereon releases the blocking of the projection part 2c of the follower screen 2, and the follower screen 2 is pulled by the spring 4 and runs in the direction of the arrow, completing exposure. At the time of rotation of the follower screen retention lever 8, the associating lever 27 is rotated in the counter-clockwise direction through the coupling lever 36 and its arm 27a falls in the notched part 19c of the initiating lever 19, but the bent part 29a of the release blocking lever 29 engages with the side edge 19f of the initiating lever and is stopped, while the delay lever 28 has its bent part 28a engaged with the change over lever 33 and stopped.

Figure 2:
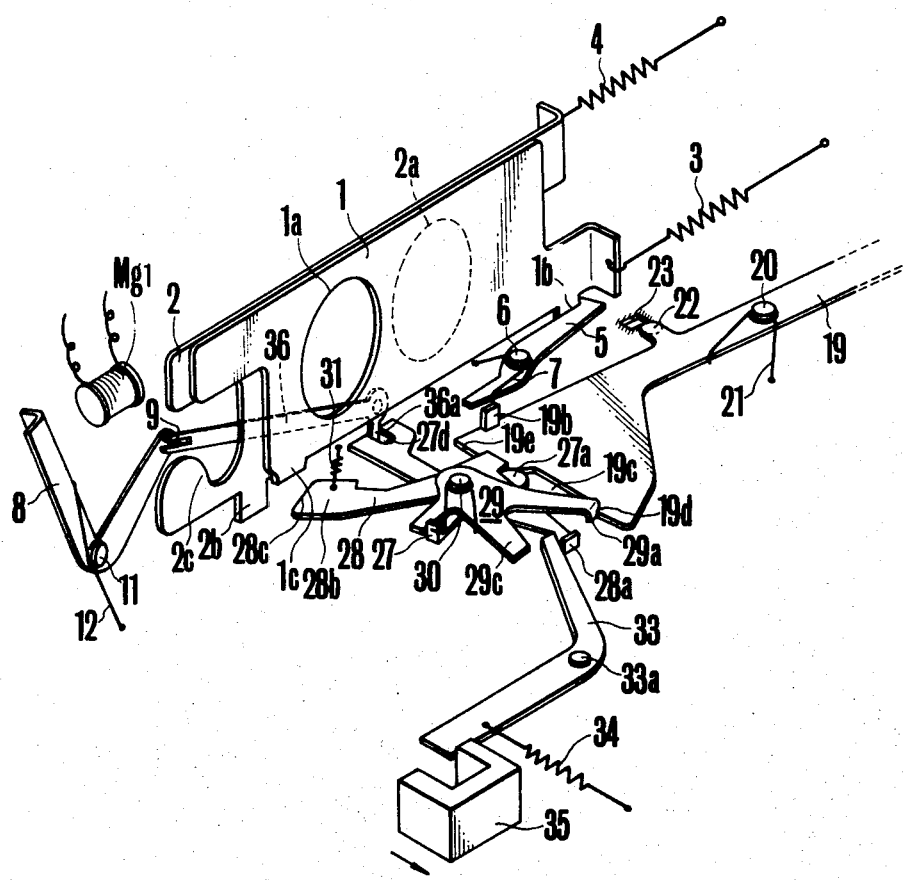

Next, explanations will be made of the case when the power source battery E is exhausted and its electro-motive force is lowered. In this case, since the Schmidt circuit T does not function and the current to the follower screen retention magnet Mg1 is shut down, the blocking lever is not attracted even if the main switch S1 is closed, but as the arm 27a of the lever 27 comes in contact with the side edge 19e of the initiating lever 19 and is stopped, the retention lever 8 is rotated in the clockwise direction through the coupling lever 36 and is stopped in a state wherein it contacts with the magnet Mg1. When the engagement between the release lever 16 and the initiating lever 19 is released in a manner mentioned above by pressing of a shutter button and the initiating lever 19 slightly rotates in the clockwise direction, the arm 27a of the lever 27 rotates in the counter-clockwise direction by the action of the spring 12 and falls in the notched part 19c of the initiating lever 19. The blocking lever 29 being coupled with the lever 27 by the spring 26 rotates simultaneously in the counter-clockwise direction and its bent part 29a engages with the stepped part 19d of the initiating lever 19, therefore the lever 19 is stopped before its projection 19b comes in contact with the leader screen blocking lever 5, thus the leader screen 1 is not released. FIG. 2 shows such a state. At this time, a photographer is warned that a shutter is not released even if he presses a shutter button as the red mark 22 is not seen within the viewing window 23. At this time, when the cover 35 (which is retained on the camera body by an appropriate latch means) of a battery chamber (not shown in the drawing) housing, the power source battery E is dislocated in the direction of arrow, the change over lever 33 rotates in the counter-clockwise direction by the power of the spring 34, and the delay lever 28 engaging therewith at its bent part 28a is pulled by the spring 31 making follower rotation, and the forward end of its arm 28b enters into the proceeding path of the projection 2b of the follower screen 2. As the change over lever 33 makes further rotation, it engages with the arm 29c of the blocking lever 29 to rotate the lever 29 in the clockwise direction around the axle 30 resisting the spring 26, therefore its bent part 29a releases the blocking of the stepped part 19d of the initiating lever 19. Thus the initiating lever 19 becomes free and rotates to clockwise direction by the force of the spring 21, rotating the leader screen blocking lever 5 as mentioned above to release the shutter leader screen 1. While the follower screen 2 engaged with the projection 1c of the leader screen 1 at its projection 2b tends to start running simultaneously with the leader screen 1 as it is not blocked by the pin 9 of the retention lever 8, at this time the projection 2b engages with the side plane 28c of the arm 28b of the delay lever, which has entered into the proceeding path thereof as mentioned above, thus running is started with a delay of a prescribed period of time. That is, such period of time as required for the projection 2b to be released from the lever 28 as said projection pushes the side plane 28c of the lever 28 to rotate said lever 28 in a direction resisting the spring 31, will become the exposure time of the shutter.

When shutter charge is done in the very state mentioned above the initiating lever 19 is rotated in the counter-clockwise direction by a means not shown in the drawing and is blocked by the release lever 16, and the leader screen 1 is blocked by the blocking lever. At this time since the release blocking lever 29 is pushed by the charge over lever 33 and the projection 29a is blocked at a position out of the rotating path of the stepped part 19d of the initiating lever, as the shutter button is pressed and the initiating lever 19 is rotated as mentioned above, the leader screen blocking lever 5 is immediately pressed by the projection 19b thereof for releasing shutter. Thus exposure with a prescribed period of time will be repeatedly done by such mechanical control as mentioned above.

Also when a new battery is loaded into the battery chamber and the cover 35 is closed, change over to an electric control mode is done again.

Figure 4:
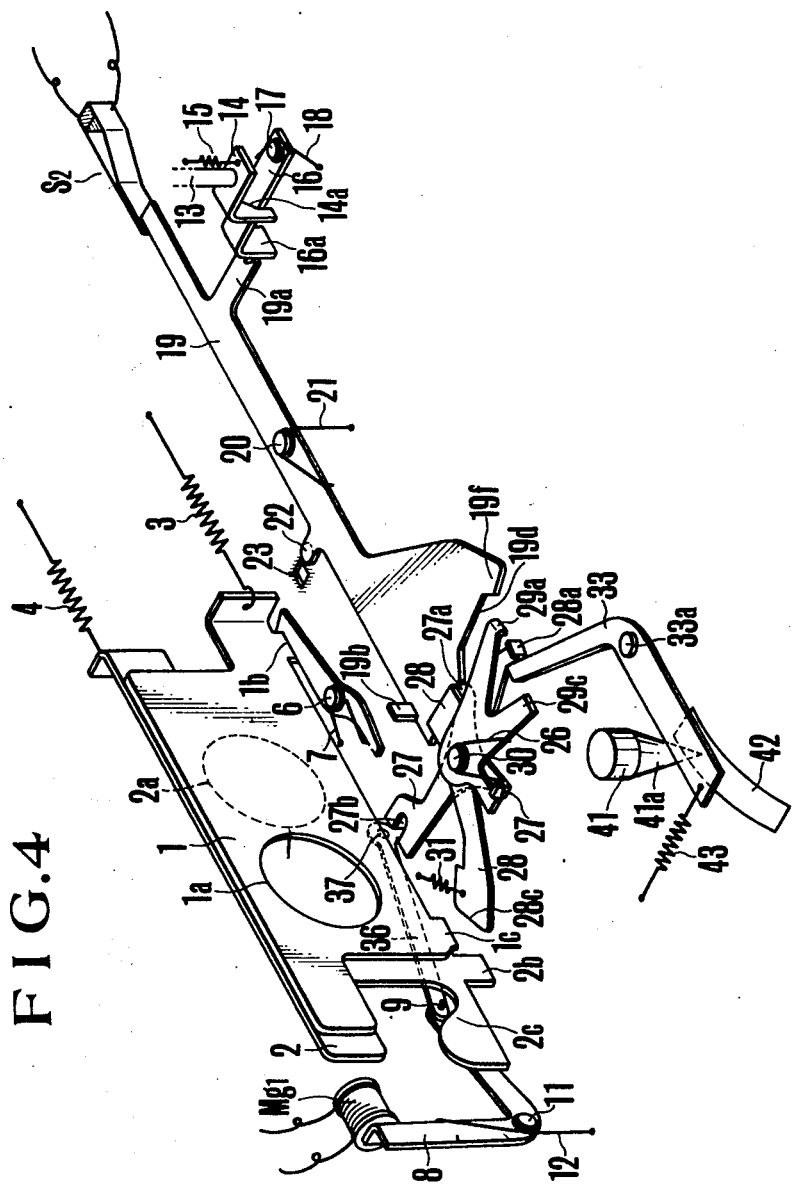
Figure 5:
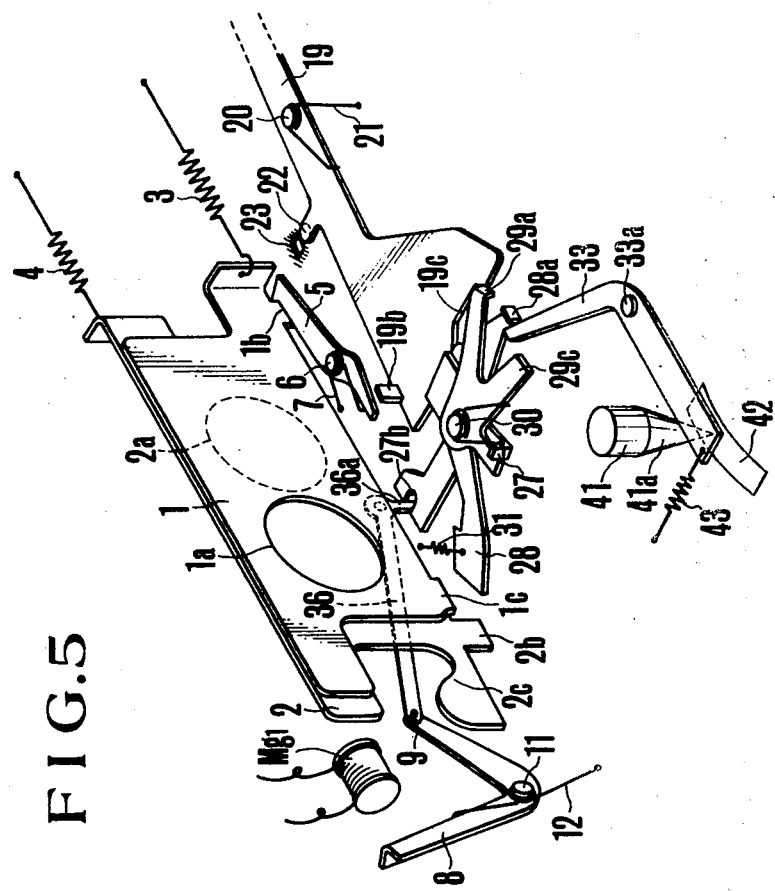

While the above example has such a set up that a change over lever 33, for change over to a mechanical control mode at a time when the battery is exhausted and the magnet does not function properly, is activated in association with the placing and displacing of the cover of the battery chamber, the example shown in FIG. 4 and FIG. 5 has such a set up that said change over lever is activated by pressing of a reset button separately provided. A shutter mechanism has exactly same set up as that in the first example as shown in the drawings, and will be represented by same identification symbols and numbers.

What is shown as 41 in said drawings is a reset button which, in normal state, comes in contact with a shock receiving member not being shown in the drawing, being pressed by the spring 42 and is stopped at a prescribed position. The change over lever 33 is pulled by the spring 43, and one of its arms engages with a conical plane 41a of the reset button while the other arm thereof blocks the bent part 28a of the delay lever, to retain the forward end part 28c of said arm at a position away from the path of the projection 2b of the shutter follower screen.

When the shutter button is pressed in a state wherein the battery is exhausted, the initiating lever 19 is blocked by the release blocking lever 29 as shown in FIG. 5 in a same manner as in the above mentioned case, thus the shutter is not released. In this case when the reset button 41 is pressed downward in the drawing, its conical plane 41a pushes the side of the change over lever 33 to rotate said lever 33 to a counter-clockwise direction around the axle 33a. When the end part 28c of the delay lever 28 enters into the path of the projection 2b of the follower screen, following the above, and the lever 33 rotates, its arm pushes the arm 29c of the blocking lever to rotate said lever 29 to clockwise direction around the axle 30, therefore, its projection 29a releases the blocking of the initiating lever 19, and the shutter functions in a same manner as in the above mentioned case. When the reset lever 41 is locked by a means not being shown in the drawing at a state as being pressed, photographing with mechanical exposure control mode can be repeatedly made in a same manner as the cover of the battery is removed in the first example. Also when photographing is done with electric control mode by loading a new battery, the above mentioned locking may be released and the reset button 41 may be resumed by the force of the spring 42.

Figure 6:
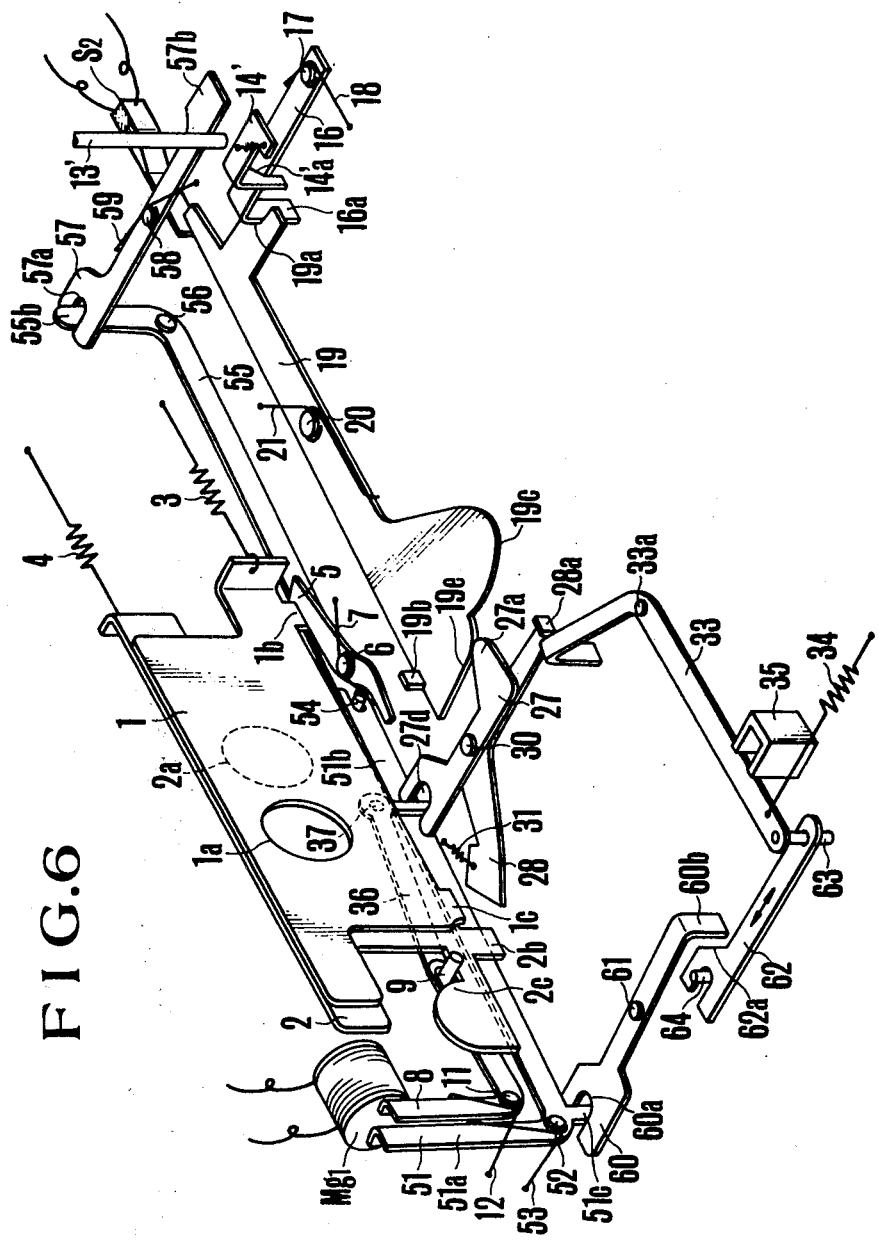
Figure 7:
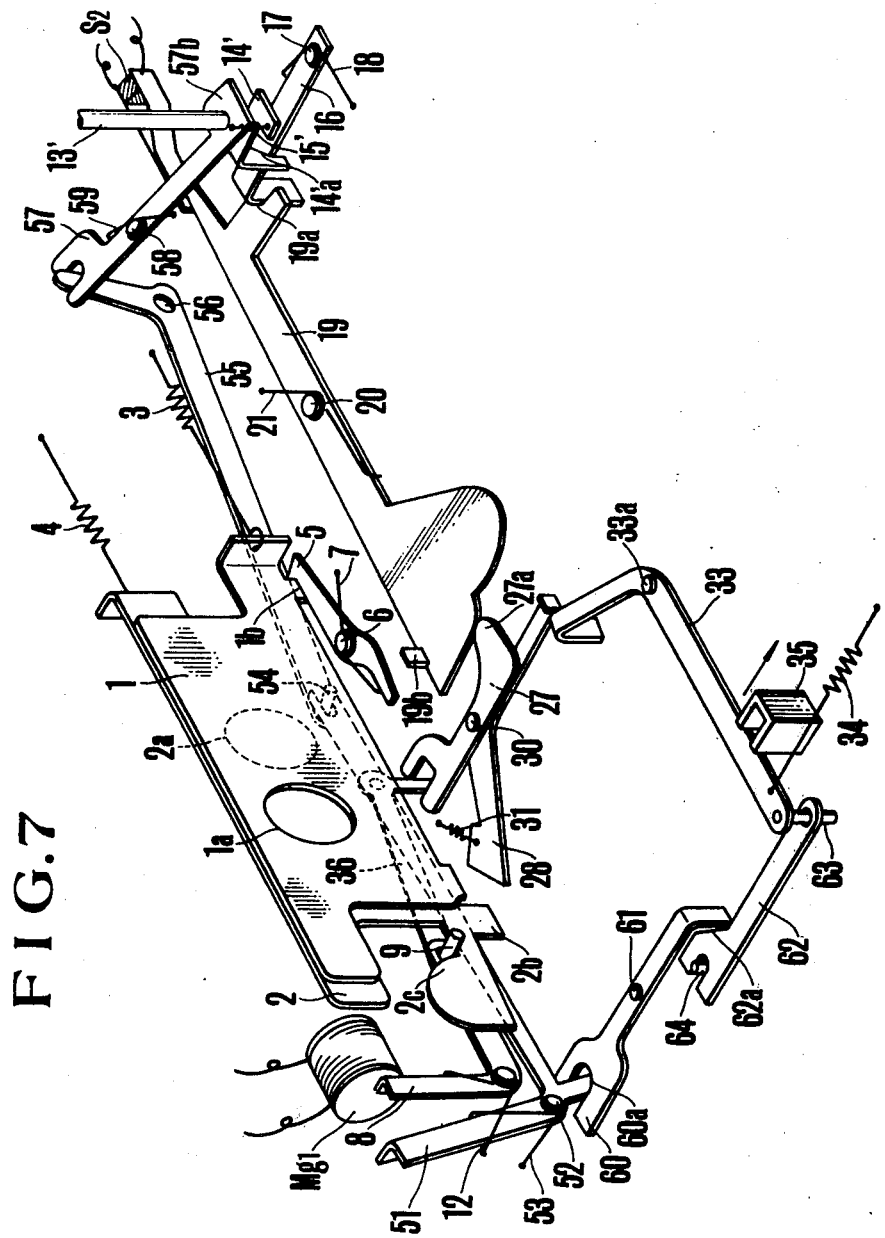
Figure 8:
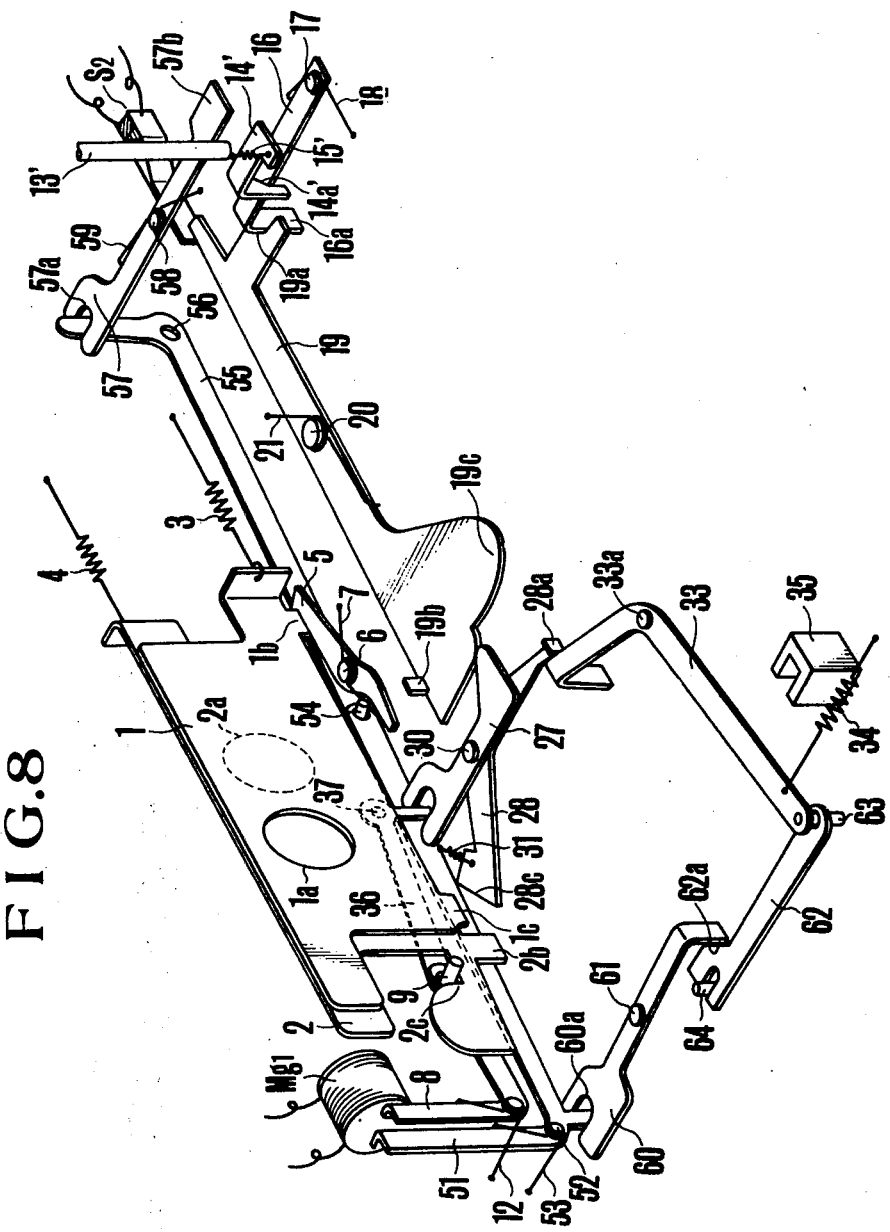

Next in a third example shown in FIG. 6 to FIG. 8, a detection lever is provided separately from the above mentioned follower screen blocking lever 8 for detecting that the magnet is not properly functioning, and a blocking member to block the pressing of the shutter button when said detection even functions, corresponding thereto, is provided.

In said drawings the members having same symbols and numbers as in the first or second examples perform same function as in said examples. What is shown as 51 is a detection lever axially supported in a manner rotatable around an axle 52, and is biased by a spring 53 to counter-clockwise direction, wherein one arm 51a thereof is so provided as attracted by the magnet Mg1 together with the above mentioned retention lever 8, while a groove part provided at the other arm 51b thereof engages with a pin 54 fixedly provided at an intermediate lever 55. Said lever 55 is so axially supported as being rotatable around an axle 56, while the other arm 55b engages with a two-arm-forked part 57a of a release lock lever 57 which is rotatable around an axle 58. The other arm 57b of the release lock lever 57 is so provided as coming in to or out of the path at the lower part of the shutter button 13', and is biased by a spring 59 to counter-clockwise direction. What is shown as 14' is a cam plate which can slide up and down along a guide member not being shown in the drawing, and has a slanted plane 14'a engaging with the release lever 16, also is pulled up by the spring 15', stopping at a position retaining a predetermined distance from the above mentioned shutter button axle 13'. The third arm 51c of the detection lever 51 engages with a two-arm-forked part 60a of a lever rotatable around an axle 61. The bent part 60b of the other arm of said lever 60 engages with a slanted cam 62a of an intermediate lever 62 associated with the above mentioned change over lever 33. Said lever 62 is loosely fitted with a pin 63 of the change over lever at its one end, and a groove part 62b provided at the other end thereof engages with a fixed pin 64 and can be shifted to a direction of arrow, following the rotation of the lever 33. What are shown as 27, 28 are an associating lever and a delay lever which can be rotated around the axle 30 in a same manner as in the above mentioned examples.

In a case of electric control mode in this example the shutter is controlled by the circuit shown in FIG. 2.

Explanations will be made on a case when the voltage of battery is at or above a prescribed value and the magnet is functioning properly. When a shutter button is lightly pressed down in a state wherein a shutter is charged, first the main switch S1 is closed and current flows to the magnet Mg1 generating magneto-motive force to attract the follower screen blocking lever 8 and the detection lever 51. By this the pin 9 of the lever 8 blocks the follower screen 2 and the intermediate lever 55 engaging with the lever 51 rotates to counter-clockwise direction around the axle 56, rotating the release lock lever 57 by its arm 55b to counter-clockwise direction around the axle 58, therefore the arm 57b of the lever 57 retreats from the path of the shutter button axle 13'. Said state is shown in FIG. 6. When the shutter button is then pressed down the lower end of the axle 13' pushes the cam lever 14' to shift the same downward and its slanted plane 14a pushed the release lever 16 to rotate the same, therefore the engagement between its bent part 16a and the initiating lever 19 is released and the leader screen blocking lever 5 is rotated by the projection 19b of the lever 19 in a same manner as in the above mentioned case to release the leader screen 1. At a same time the switch S2 is opened and a time constant circuit starts functioning. While the engagement between the arm 27a of the associating lever 27 and the side edge 19e is released by the rotation of said lever 19, since the blocking lever 8 is retained by the magnet Mg1, the lever 27 is not rotated. When the switch S2 is opened and the charging of the capacitor C is started then as its voltage reaches a prescribed value, output voltage is generated at the output terminal of the Schmidt circuit T and as the current to the magnet Mg1 is shut down the lever 8 rotates to counter-clockwise direction by the force of the spring 12, releasing the blocking of the follower screen 2 by the pin 9 on said lever 8, thus the follower screen runs to complete exposure. At a same time, the lever 51 rotates to counter-clockwise direction by the force of the spring 53 and as the shutter button resumes its original position, the release lock lever 57 rotates to clockwise direction around the axle 58 and its arm 57b is shifted to a position blocking the lowering of the shutter button axle 13'. Next, in a case when the battery is exhausted and the magnet does not function properly, even if the shutter button is lightly pressed and the main switch S1 is closed after the shutter is charged the detection lever 51 is not attracted to the magnet Mg1, therefore the release lock lever 57 associated with said lever 51 is at a position to block further pressing of the shutter button axle 13', thus the shutter is not released. Such state is shown in FIG. 7.

Next, to release said release lock state, the battery cover 31 is displaced in a same manner as in the case of the first example. The change-over lever 33 which has been blocked by the battery cover 35 is pulled by the spring 34 and rotates to counter-clockwise direction around the axle 33a and slides the lever 62 by the pin 63 on the same.

Therefore, the slanted plane 62a of said lever 62 pushes the bent part 60b of the lever 60 to rotate said lever 60 to counter-clockwise direction around the axle 61, thus the detection lever 51 engaging therewith is rotated to clockwise direction around the axle 52 resisting the spring 53. Therefore the release lock lever 57 rotates to counter-clockwise direction through the lever 55, and its arm 57b retreats from the proceeding path of the shutter button axle 13' to release the release lock. On the other hand, the delay lever 28 engaging with the other arm of the change over lever 33 is pulled by the spring 31 and its one end 28c enters into the moving path of the projection 2b of the follower screen and change over is made to mechanical control mode. FIG. 8 shows such state. Thereafter such action that the initiating lever 19 is rotated by the pressing of the shutter button through the cam plate 14, the release lever 16 for releasing the shutter is same as in the above mentioned examples.

While the examples mentioned above have such set up the state of exhaust of battery is detected by no-functioning of the shutter follower screen retention magnet, an electro-magnet is provided separately for detecting exhaust of battery in the example shown in FIG. 9 to FIG. 12. In these drawings same members as in the above mentioned examples are shown by same identification symbols and numbers.

What is shown as 71 is a release lock lever slidably supported and is biased by a spring 72 to such direction as entering into the path of the shutter button axle 13', and has a bent part 71a. What is shown as 73 is a detection lever provided in a manner rotatable around the axle 73b and has a bent part 73a engaging with said bent part 71a at its one end, while the other arm thereof is so provided as contacting a detection electro-magnet Mg2 and is biased to such direction as resisting the attracting power of the magnet Mg2 by a spring 74. What is shown as 76 is a transmission lever axially supported in a manner rotatable around an axle 76a, and has a bent part 76b engaging with said bent part 71a at its one end, also engages with a pin 77 of the change over lever 33' by a long groove provided at the other end thereof.

One arm of the change over lever 33' is blocked by the cover 35 of battery chamber in a same manner as in the above mentioned case, while the other arm 33'b thereof engages with the bent part 28a of the delay lever 28.

FIG. 12 is a shutter control circuit being almost same as FIG. 3, wherein Mg2 is a detection magnet, Tr1 is a transistor, and R1, R2 are resistors having their ratio of resistance values so set as flowing such base current that the transistor Tr1 comes into cut off zone when the electro-motive force of the battery E becomes to the limit value for use or below.

Explanations will be made on the function of the shutter mechanism in a case when the battery is not exhausted.

First, when the shutter button is lightly pressed, the main switch S1 is closed and current flows to the magnets Mg1 and Mg2 generating magneto-motive force, and the follower screen blocking lever 8 and the detection lever 73 are attracted. Therefore, the release lock lever 71 is pulled by the up-riser part 73a of the detection lever 73 and is shifted to a direction of arrow shown in FIG. 9 and is blocked at a position being away from the path of the shutter button axle 13' as shown in the drawing. When the shutter button is pressed down further, the shutter leader screen runs in a same manner as in the above case and the magnet Mg1 is demagnetized as a predetermined length of time has elapsed after the leader screen runs by the action of the circuit shown in FIG. 12, and the follower screeen blocking lever 8 is rotated by the action of the spring 12 to clockwise direction, then the blocking of the follower screen by the pin 9 is released, therefore the followr screen 2 runs thus completing exposure.

Next, when the battery is exhausted the shutter button is lightly pressed in a shutter-charged state and even if the main switch is closed, as the electro-motive force of the battery E is lowered, the transistor Tr1 is placed in a cut-off state, and current will not flow to the magnet Mg2. Therefore, the detection lever 73 is not attracted to the magnet Mg2 and is placed at a position being rotated to clockwise direction by the spring 74. Therefore, the release lock lever 71 is pulled by the spring 72 and comes below the shutter button axle 13' to block the further pressing of the shutter button, thus the shutter is not released. FIG. 10 shows such state. A battery cover 35 is used also in this example to release said shutter lock state. That is, as shown in FIG. 11, when the battery cover 35 is removed from the camera, the change over lever 33' is pulled by the spring 34 and is rotated to counter-clockwise direction around the axle 33'a, and rotates the transmission lever 76 through the pin 77 on one of its arms around the axle 76a. As the up-riser part 76b of the lever 76 engages with the bent part 71a of the release lock lever 71 and shifts said lever 71 to the direction of arrow, the release lock state is released allowing the pressing of the shutter button. On the other hand, the delay lever 28 which has been checked by the other arm 33'b of the change over lever 33' is pulled by the spring 31 and rotates around the axle 30, and its one end 28c comes to such position as causing the delay of the running of the follower screen. Then as the shutter button is pressed the shutter functions in a same manner as in the above mentioned cases, thus photographing is done with such exposure time as mechanically controlled.

FIG. 13 to FIG. 17 shows an example having such set up that when a battery is exhausted the non-functioning of a follower screen retention magnet is detected and the shutter charge action is locked. In this example also the shutter mechanism has same structure as that in the above mentioned examples, and same members are identified by same symbols and numbers.

In these drawings, what is shown as 80 is shutter charging slider, being slidably supported at the camera main body and such tendency as returning to right direction in the drawing is given thereto by a spring 81 being spanned between the projection 80d and the fixed part. What is shown as 82 is a finger piece fixed to said slider. What is shown as 83 is a charge transmission lever being supported slidably at a main body of camera, and having an arm 83b engaging with an arm 80b of said slider, a projection 83a engaging with the side plane of the initiating lever 19, and a projection 83c engaging with the projection 1d of the shutter leader screen, further having a restoring force to right direction in the drawing given thereto by a spring 84.

The transmission lever 83 further has a rack part 83d provided at its forward end and engages with a sector gear 85 of a film wind up mechanism. What is shown as 86 is a charge blocking lever being axially supported in a manner rotatable around an axle 87, wherein its one arm 86a is so bent as can be engaged with the projection 80a of the slider 80, while the other arm thereof is engaged by pin-groove engagement with the arm 51b of the detection lever 51 by a pin 88.

FIG. 17 is to show a shutter control circuit in this example, wherein P is a photo-conductive element, E is a power source battery, S1 is a main switch, S2 is a count starting switch, S3 is a battery detection switch, and C is a capacitor which forms a time constant circuit together with said photo-conductive element. T is a Schmidt circuit, wherein when the electric potential at its input terminal A reaches a prescribed level, the electric potential at its output terminal B reaches same level as that of the plus terminal of the power source battery E, while said output level becomes same level as that of the minus terminal of the power source battery E when the input level is below said prescribed level. Mg1 is a follower screen retention magnet, and Tr2 is a transistor connected in series to said magnet, and is so set that it adjusts the ratio of the resistance values of the resistances R2 and R3 when said detection switch S3 is closed so that the transistor Tr2 is conducted through when the electro-motive force of the power source battery is at the limit value for use or above. First, explanations will be made on a case when the voltage of battery is at limit value or above in the above mentioned set up.

In FIG. 13, when a finger is placed on the finger piece 82 to shift the slider 80 to the direction of arrow, its projection 80c pushes a contacting piece of the above mentioned battery detection switch S3 to close said switch. In this case since the electro-motive voltage of the power source battery E is sufficiently high, the transistor Tr2 is conducted through and magnetizing current flows to the magnet Mg1 to generate magneto-motive force. Therefore said detection lever 51 in attracted to the magnet 3 and rotates to clockwise direction around the axle 52. Thereby a charge lock lever 86 rotates to counter-clockwise direction around an axle 87. By this, since the charge lever 86 is shifted to such position as not engaging with the projection 80a of the charge slider 80, said charge slider 80 is further shifted to left direction and its projection part 80b pushes the projection part 83b of the above mentioned charge transmission lever 83, thus said charge transmission lever 83 is shifted to left direction resisting the spring 84. Since the projection part 83a presses the side plane of the above mentioned initiating lever 19 thereby, said initiating lever 19 rotates to counter-clockwise direction around the axel 20, and finally its notched part 19a engages with the above mentioned shutter release lever 16. At this time the count starting switch S2 is pressed by the side edge of the initiating lever 19 and is placed in a closed state. As the above mentioned battery detection switch S3 is placed in an opened state again at this time, the detection lever 51 and charge lock lever 86 are returned to the state shown in FIG. 13. Also, at a time when the charge transmission lever 83 is shifted to left direction as mentioned above, its projection part 83c presses the projection part 1c of the leader screen 1, therefore the leader screen 1 is shifted to left direction resisting the spring 3, and the follower screen 2 being engaged with the leader screen 1 by the projection part 1c is simultaneously shifted to left direction resisting the spring 4. Therefore, finally the projection part 1b of the leader screen 1 engages with the forward end of the leader screen blocking lever 5. Also, by said shifting of the charge transmission lever 83 to left, the gear 85 engaging with the rack part 83d rotates to counter-clockwise direction, and film is wound up by a member which is not shown in the drawing but is associated with said gear 85. Said state is shown in FIG. 14.

When a finger is removed away from the finger piece 82 then, the charge slider 80 and the charge transmission lever 83 are shifted to right direction and returned to the positions shown in FIG. 13 by the restoring power of the springs 81 and 84, respectively. Contrary to this, the initiating lever 19, the leader screen 1 and the follower screen 2 are blocked by the shutter release lever 16 and the leader screen blocking lever 5 respectively, thus they are left retained at said positions, thus the shutter is placed in a charged state.

Next, explanations will be made on shutter release action. First when the shutter button 13' is pressed in this state, said shutter button 13' presses the shutter release transmission member 14' and said member 14' is shifted downward resisting the spring 15'. By this, its slanted side plane 14'a rotates the shutter release lever 16 to clockwise direction and the engagement between said lever 16 and the notched part 19a of the initiating lever 19 is released, then said initiating lever 19 rotates to clockwise direction and its projection part 19b presses the side plane of the leader screen blocking lever 5 to rotate said leader screen blocking lever 5 to clockwise direction, therefore the engagement between its forward end part and the projection part 1b of the leader screen 1 is released, and said leader screen 1 runs ahead to right direction by the restoring power of the spring 3. At the time when the shutter button 13' is pressed as mentioned above, the main switch S1 is placed in a closed state by a member not being shown in the drawing and current flows to the magnet Mg1 generating magneto-motive force, therefore the follower screen blocking lever 8 is attracted by the magnet Mg1, and the pin 9 of said lever 8 engages with the groove part 2c of the follower screen 2 to block the running ahead of said follower screen 2. The time for the follower screen to start running is determined as mentioned below.

At a time when the initiating lever 19 rotates to clockwise direction, the above mentioned count starting switch S2 is placed in an opened state, thereby the capacitor C is charged by such time constant as corresponding to the amount of light received by the photo-conductive element P, then as said charged voltage reaches a prescribed level, voltage is generated at the output terminal of the Schmidt circuit T, and current to the magnet Mg1 is shut down, losing its magneto-motive force. Therefore the follower screen blocking lever 8 rotates to counter-clockwise direction by the restoring power of the spring 12, and the engagement between the pin 9 and the groove part 2 of the follower 2 is released thus the follower screen 2 runs to right direction by the resotring power of the spring 4, completing exposure. By this the system is returned to the state shown in FIG. 13.

Next, explanations will be made on the functional principle by which the shutter charge is locked.

In FIG. 13, when a finger is placed on the finger piece 82 to manually shift the charge slider 80 to left direction, the battery detection switch S3 is placed in a closed state by its projection part 80c, but as its electromotive voltage is below the limit value for use, the transistor Tr2 is not conducted through thus current will not flow to the magnet Mg1. Therefore, such magneto-motive force as attracting the detection lever 51 is not generated, thus the above mentioned charge lock member 86 will not be rotated from the position shown in FIG. 13, and the projection part 80a of the charge slider 80 engages with the arm 86a of said charge lock member 86, preventing further left hand shifting of the slider 80. Thus the shutter charge is locked when the power source battery is exhausted. Such state is shown in FIG. 15.

Next, explanations will be made on the release of the shutter charge lock. This example has such mechanism that the shutter charge lock is released by removal of the battery cover 35. First, when the battery cover 35 is manually shifted to the direction of arrow in FIG. 13 under the above mentioned state, the change over lever 33 rotates to counter-clockwise direction by the restoring power of the spring 34, and the transmission lever 62 coupled therewith is shifted to right direction. At this time as the slanted side plane 62a of the transmission lever 62 presses the side plane of the transmission lever 60, said transmission lever 60 rotates to counter-clockwise direction. By this, clockwise rotaton is given to the detection lever 51 by the groove part 60a of the transmission lever 60, and the charge lock lever 86 coupled therewith is rotated to counter-clockwise direction. Therefore, the engagement between said charge lock lever 86 and the projection part 80a of the slider 80 is released allowing said slider 80 to be shifted to left direction. When the change over lever 33 further rotates to counter-clockwise direction, the delay lever 28 has its engagement with the charge over lever 33 released and is rotated to clockwise direction by the restoring power of the spring 31, and its forward part 28c is shifted to such position as being able to contact with the projection part 2b of the follower screen 2.

Through the above mentioned actions the shutter charge lock is released.

Also in this example, when shutter release is made while the battery cover 15 is removed a mechanical exposure time control mechanism functions to conduct prescribed exposure. FIG. 16 shows a state in which shutter charge lock is released.

First, when shutter charge is done and the shutter button 13' is pressed in the state of FIG. 16, the leader screen 1 starts running ahead in the above mentioned operational sequence. In this case, while the main switch S1 is closed by the pressing action of the shutter button 13', the attracting power of the magnet Mg1 is not sufficient because the battery is exhausted, thus the follower screen blocking lever 8 rotates to counter-clockwise direction by the restoring power of the spring 12, and the engagement between the pin 9 and the groove part 2c of the follower screen 2 is released. Therefore, while the follower screen 2 starts running simultaneously with said running of the leader screen 1, the delay lever 28 immediately contacts with the projection part 2b of the follower screen 2, thus the follower screen 2 will run with a delay of a predetermined length of time by said contact. By this prescribed mechanical exposure time control is done.

As has been explained above in this example, at a time battery is exhausted the shutter charge blocking lever 86 rotates to clockwise direction and engages with the projection part 80a of the slider 80 to lock the shutter charge, and said lock is released by removing the battery cover 15.

As has been explained above in the present invention, when the power source battery is exhausted and the followr screen retention magnet can not function properly, said state that the power source battery can not function properly is detected to lock the shutter release or shutter charge action thus the state wherein proper functioning is impossible can be detected, thus failure in photographing can be prevented beforehand and waste of film can be eliminated. Also even when a replacement battery is not readily available, a mechanical shutte mechanism functions with a prescribed period of time by the insertion and removal action of power source battery mentioned above, so that intended photographing can be performed, thus the practical advantages of the present invention are quite large.

What is claimed is:

1. A camera having an electric shutter including a means to initiate shutter opening action, an electro-magnet to control a shutter closing action by output of an exposure time control circuit, and a power source battery located in a battery chamber, comprising:
   a detection means including an electro-magnet for detecting the power supply from the power source battery;
   a blocking means operatively associated with said detection means to block the action of said release means when the failure of the power supply is detected;
   a cover for the battery chamber;
   a change-over means which can be operated by said cover to release said blocking means, and
   a mechanical delay means which is shifted in operative assciation with said change-over means to such a position as delaying the shutter closing time for a prescribed period of time.

2. A device according to claim 1, in which said release means comprises a shutter button, and said blocking means is operatively associated with said detection means for blocking the pressing of the shutter button when the detection means detects failure of the power supply.

3. A camera according to claim 1, in which the electromagnet of the detection means is used also to control the shutter closing action.

* * * * *